United States Patent Office 3,457,623
Patented July 29, 1969

3,457,623
METHOD FOR BALANCING ROTATING PISTONS AND OTHER ROTORS OF THE PLANETARY MOTION TYPE
Heinrich Hack, Darmstadt, Germany, assignor to Carl Schenck Maschinenfabrik GmbH, Darmstadt, Germany, a corporation of Germany
Filed Sept. 1, 1966, Ser. No. 576,610
Claims priority, application Germany, Sept. 4, 1965, Sch 37,676
Int. Cl. B23q *17/00;* B23b *39/00*
U.S. Cl. 29—407     5 Claims

ABSTRACT OF THE DISCLOSURE

A planetary-motion rotor is mass-balanced by correcting the rotor for unbalance by changing the amount of its material at coordinately interrelated localities of at least one correction plane. A correction is superimposed by a balanced change of rotor material in an amount equal to the difference of the original rotor weight modified by the first change minus a predetermined datum weight.

---

My invention relates to a method for balancing rotors relative to one or more correction planes; and in a more particular aspect concerns the balancing of rotary pistons and other structures that, aside from rotating about their own axis, move about another axis or center in planetary fashion.

Relative to turbine wheels and similar composite rotator structures to be balanced, it is known to individually check the blades or other components in order to sort them by weight or mass distribution, and to thereafter assemble the composite structure from individual components of the same weight or weight distribution in such a manner that, upon completion of the assemblage, the unbalance of the entire rotary structure remains within permissible limits. A similar principle is applied in the production of automotive engines when assembling the crankshafts with subassembled groups of pitmans and pistons. The individual components are kept assorted by weight. The assembly areas for such products, however, constitute bottlenecks and are often the sources of faulty products which sometimes affect the entire manufacturing output. More recently, therefore, pitmans have been weighed to determine their difference in weight relative to a master pitman, and corrections have been made, for example, by milling operations, to provide better uniformity.

The problem becomes even more aggravated with planetary-motion rotors, such as the rotating pistons of Wankel engines. The rotating piston of a Wankel engine must be corrected for mass balance, because it rotates about its own axis while its center is guided by an eccentric shaft to simultaneously rotate about another axis. A selection may be made by balancing the individual pistons and then sorting them by weight. In production on a large scale, however, this manner of providing for acceptable balance conditions is unsatisfactory, particularly in view of the desirability to readily permit an exchange of such pistons.

It is an object of my invention to avoid the aforementioned shortcomings of the known methods.

More specifically, it is an object of the invention to devise mass correction methods which provide economical processing of any number of workpieces such as, for example, rotating pistons and light planetary-motion structures, and provide not only for mass balance of each individual workpiece but also for uniformity of weight among any number of products.

According to the invention, I first determine the balance condition of each individual workpiece in the conventional manner, thus obtaining a set of coordinate unbalance magnitudes which constitute corresponding control magnitudes for the operation of the machine tools which correct any unbalance of the workpiece. Upon these control magnitudes for unbalance correction I superimpose another control magnitude which corresponds to the difference between a predetermined datum or reference weight and the actual weight of the workpiece, the latter being constituted by the raw weight of the unbalanced workpiece increased or reduced by the change in weight resulting from the unbalance correction to be performed.

According to another feature of my invention, the method is performed in such a manner that the raw weight of the unbalanced rotor is chosen to be always higher than the datum or reference weight, any workpieces not satisfying this condition being eliminated from the outset. Thus, the unbalance correction is effected by removal of material, preferably from predetermined localities of the rotor workpiece, and the superimposed control magnitudes are proportional to the difference between the raw weight reduced by the weight of the material to be removed for balance correction, minus the predetermined datum or reference value of the rotor weight.

According to another feature of my invention, the correction of the unbalance and the weight compensation are performed simultaneously by one and the same set of machine tools. Such elimination of the previously ascertained unbalance and of any discrepancies in weight are effected in one or more diametrical correction planes of the rotor and preferably on prelocated coordinately interrelated radii, areas or localities. The aforementioned and further features of my invention will be apparent from the following description with reference to the accompanying drawings, dealing with the mass correction of a rotating piston of a Wankel engine.

It is preferable to employ balanced rotors of a given constant weight in engines equipped with two or more of such pistons because this ensures the balance and quiet operation of the engine. Relative to the exchange of a rotary piston, it is also desirable to substitute a balanced piston of the same weight and to avoid any delay which would be encountered if a balance measuring operation and a corresponding selection is necessary. If care is taken that all of the manufactured pistons are balanced and of equal weight, the number of pistons to be kept in stock is greatly reduced and any additional correction requirements are avoided. In some cases, it is also important to take into account that such pistons are provided with hollow interior spaces which are filled with cooling liquid when the engine is in operating condition, and this should be considered when a combined balance and weight correction is undertaken. The latter requirement is also readily satisfied in accordance with the present invention, if during the measuring operation the piston itself is filled with the cooling liquid or the operating condition is simulated by a substitute medium filling the hollow space of the individual piston in lieu of the coolant.

The measuring and correcting operation for a circular piston which is to have a predetermined, constant weight after the correcting machine operation, is hereinafter explained with reference to the accompanying drawings. While a correction by means of drilling is described, it should be understood that this is not essential to the invention. The necessary removal of material may be effected by any other machine operation, or the correction may also be effected by adding material such as, for example, by deposition welding.

In order that the present invention may be readily carried into effect, it will now be described with reference to the accompanying drawings, wherein.

Figure 1:
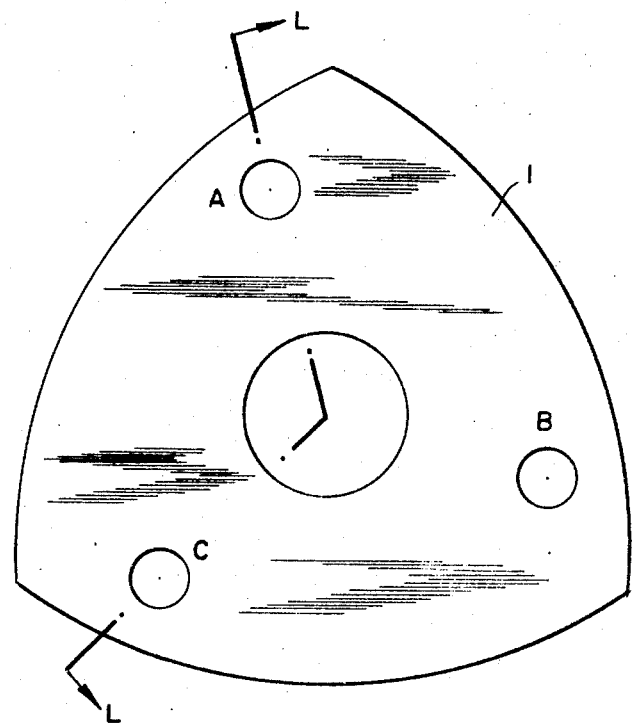
FIG. 1 is a plan view of a rotating piston of the type balanced by the method of the present invention.
Figure 2:
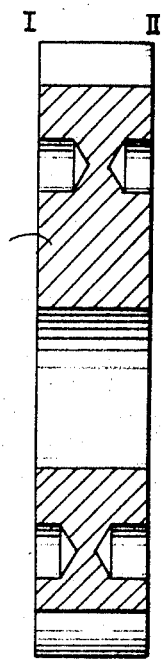
FIG. 2 is a cross section taken along the lines L—L of FIG. 1 and indicating at I the left correction plane and at II the right correction plane.

In FIGS. 1 and 2, A, B and C are the predetermined localities at which the correction of balance and weight is to be effected.

In the following disclosure:

$G_R$ denotes the raw weight of a piston, which may have an inner magnitude or hollow having a magnitude which differs from piston to piston.

$G_I$ denotes the theoretical weight value of a piston. The theoretical value is preset for the selection of the pistons to be subjected to further fabrication. For example, $G_I$ is always kept smaller than the raw weight $G_R$ of the piston. All pistons having a weight which is larger than or equal to $G_I$ are subjected to the correcting operation, whereas all pistons having a weight smaller than $G_I$ are eliminated and are not corrected.

$G_{U\ max}$ denotes the weight of the material which must be eliminated to compensate for an expected maximum unbalance. This is a predetermined magnitude.

$G_S$ denotes the datum or reference value which the rotary piston is to have after completion of the correcting machine operation. This datum value is the same for all workpieces to be processed in a series.

$G_U$ denotes the weight of the entire material to be removed for correction of unbalance. $G_U$ must be smaller than or equal to $G_{U\ max}$.

U designates the unbalance present in the piston to be corrected.

X denotes the difference between the raw weight $G_R$ diminished by the amount $G_U$ minus the datum weight $G_S$.

An equation defining the relationship of the aforedescribed magnitudes is $$G_I = G_S + G_{U\ max} \quad (1)$$

This equation simply states that the theoretical weight $G_I$ is to be such that the piston possesses the datum weight $G_S$ after the amount of material required for correcting the expected maximum unbalance has been removed such as, for example, by being drilled from the piston. To reliably satisfy this requirement, only those pistons are to be further processed which have a raw weight $G_R$ which is greater than or equal to the theoretical weight $G_I$. As a rule, the weight $G_U$ of the material to be removed from a piston in order to correct its actual unbalance U, will be smaller than the weight $G_{U\ max}$ of the material which would have to be removed if the piston had the maximum expected unbalance; that is, $G_U$ is smaller than or equal to $G_{U\ max}$.

A given piston which has been corrected for unbalance does not necessarily have the datum weight. In order to bring the weight of such a piston down to the datum weight, additional material having a total weight X must be removed, and this must be done in such a manner that the balance condition of the piston is not changed. It follows that:

$$G_S = G_R - G_U - X \quad (2)$$

Figure 3:
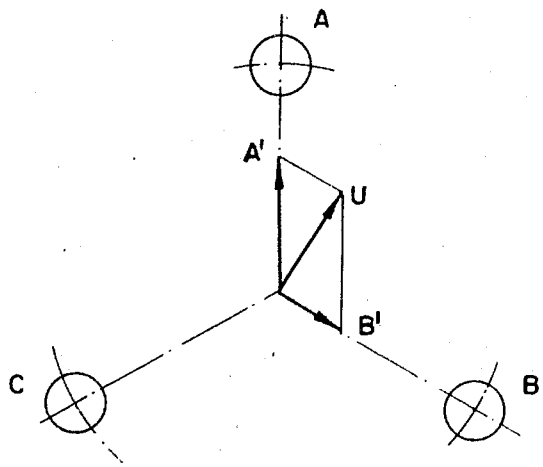
FIG. 3 is a schematic diagram which explains the method of the present invention.

FIG. 3 shows the relative position of the three predetermined areas or localities A, B, C available for unbalance correction on a piston of the type shown in FIGS. 1 and 2.

The unbalance of the piston is first measured on suitable balance analyzing apparatus, which may operate, for example, on the polar principle, and the unbalance U, indicated in FIG. 3 by the vector U is determined. Balance analyzing methods are well known as such. Suitable balance analyzing methods are described in United States Reissue Patent No. Re. 24,620 and United States Patent No. 2,933,984, both assigned to the assignee of the present invention. Both patents also disclose examples of equipment for converting the polar indication of unbalance into Cartesian coordinates, such as the coordinate unbalances A' and B' represented by the vectors A' and B' in FIG. 3. The vectors A' and B' are directionally coincident with the respective radii on which the areas of localities A and B of the piston to be corrected are situated.

Figure 4:
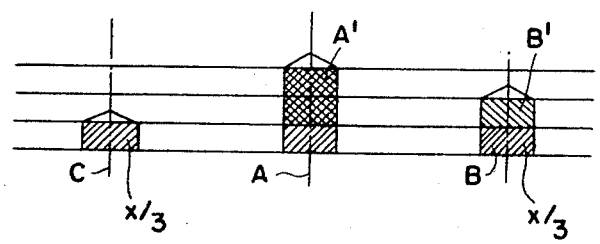
FIG. 4 is a schematic indication relating to the amount of material to be removed at the three areas or localities A, B, C.

The amounts of material corresponding to the values A' and B' are to be drilled away at the corresponding areas A and B of the piston. In addition, the weight X is to be drilled away without changing the balance condition. For this purpose, one-third of the amount X is to be drilled out at each of the three areas A, B and C symmetrically with the center axis, as indicated in FIG. 4. The units of volume or depth to be drilled for unbalance correction are identical with the units utilized for compensation of the piston weight. Consequently, at the areas A and B, the total amount of material to be drilled out must be $A' + X/3$ and $B' + X/3$, respectively, whereas at the area C only the amount $X/3$ is to be drilled out. The machine operation represented in FIGS. 3 and 4 can also be effected in several correction planes, in which case the total value X is to be divided by the total number of tools participating in the machine operation.

The aforedescribed method of the invention may be readily performed semiautomatically or fully automatically. Applicable to semiautomatic operation, for example, are digital control and logic systems of the type described in United States Patent Nos. 2,682,046 and 2,810,307. It is only necessary to manually enter the respective digit values for the additive amounts corresponding to the value X into the automatic control of the unbalance correcting tools. In accordance with the present invention, however, it is particularly advantageous to perform the entire method automatically, by control and memory systems generally of the type known from the aforementioned patents.

Figure 5:
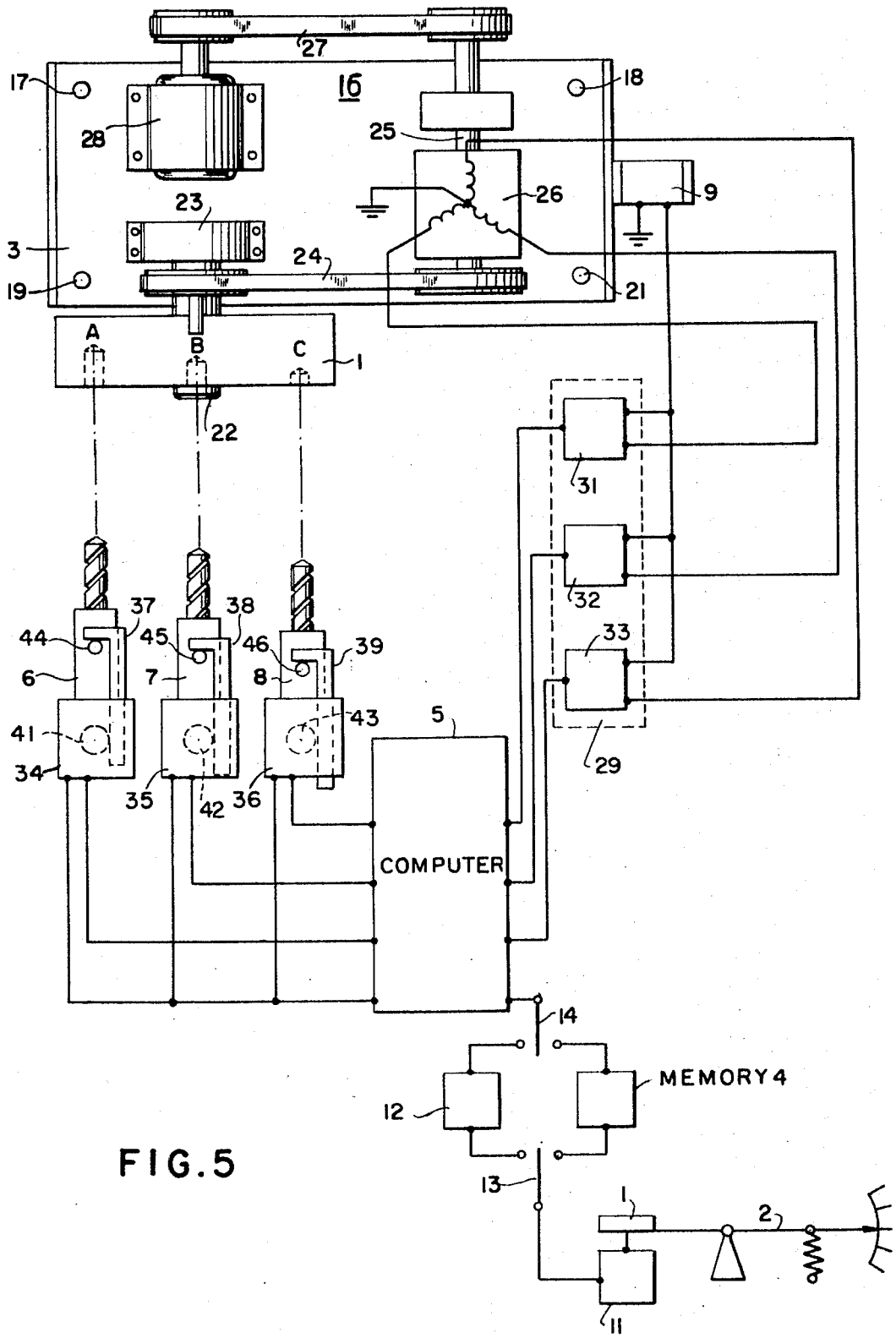
FIG. 5 is a schematic diagram of an embodiment of the balance correcting apparatus of the present invention, together with a schematic block diagram of an embodiment of the appertaining control system.

A preferred embodiment of apparatus of the present invention is described with reference to FIG. 5. The automatic correction system of FIG. 5 comprises a balancing scale 2 upon which the planetary-motion piston 1 is placed for determining its raw weight $G_R$. The balancing scale is equipped with an analog-to-digital encoder 11 which enters the measured value of $G_R$ into a pulse storing memory 4 such as, for example, a counter or shift register. The memory 4 may comprise a plurality of additional memories, only one of which, 12, is shown in FIG. 5. The additional memories 12 are provided so that another workpiece can be weighed while the first one passes through the further stages of operation. The memories are selectively controlled for sequential operation by switches 13 and 14. The memories 4 and 12 may comprise any suitable known memories.

Only those pistons are passed to the next stage of the system that have a weight $G_R$ at least equal to a preadjusted theoretical weight $G_I$. Any piston not satisfying this condition is eliminated, for example, by being shunted to a conveyor which transfers it to a reject area. If the measured piston weight $G_R$ is equal to or larger than $G_I$, then the value $G_R$ is supplied to a computing device 5 of any suitable known type where it is stored for subsequent use.

The piston is then transferred to and placed upon the balancing machine 3. The balancing machine 3 determines the unbalance of the piston with the assistance of a diversion pickup 9 included therewith and the resulting unbalance value U is supplied to the computer 5. The unbalance values in the computer 5 appear as two coordinate values A, B or A, C or C, B, depending upon the angular position of the center of unbalance on the workpiece. The resultant output of the computer 5 is supplied to the particular two machine tools needed to correct the unbalance by drilling into the workpiece at the predetermined areas or locations down to a depth corresponding to the corresponding amounts A, B or C. In FIG. 5, for example, the unbalance coordinate magnitudes are supplied to the drilling tools 6 and 7 for drilling corresponding holes at areas A and B in accordance with the depths indicated in FIG. 4.

The computing device 5 also determines the difference between $(G_R - G_U)$ and $G_S$. This difference corresponds to the weight X, which must additionally be drilled out of the piston. Subsequently, a portion of the additional weight X is issued to the controls of all available machine tools. If the correction is to be effected in only one correction plane, the weight X is equally distributed upon the control of the three tools 6, 7 and 8, in accordance with the indications of FIG. 4. This avoids changing the balance correction by a simultaneous correction of the rotor weight, both being effected simultaneously and automatically.

The particular balancing machine utilized is not essential to the invention proper. The balancing machine 3 schematically represented in FIG. 5 is similar to the one illustrated and described in my copending application Ser. No. 372,652, filed June 4, 1964, now abandoned, and assigned to the assignee of the present invention. The balancing machine 3 comprises a horizontal table structure or plate 16 mounted on four vertical spring struts of which only the fastening means 17, 18, 19 and 21 are seen in FIG. 5. The rotor 1 to be tested is seated on a shaft 22 journalled in a bearing 23 which is firmly secured to the table structure 16.

The shaft 22 is driven by transmission via a belt drive 24 and a shaft 25 of a phase reference generator 26 which is mounted on the table structure 16. The shaft 25 is driven by a belt 27 which in turn is driven by an electric motor 28 secured to the table structure 16. The pickup 9 is fastened to the table structure 16 and may comprise a vibration transducer of the moving-coil type which produces a voltage having a frequency and amplitude which depend upon the frequency and amplitude of any vibration to which said table structure is subjected. The table assembly is normally balanced so that such vibrations are due only to unbalance of the workpiece 1.

During rotation of the workpiece 1, any vibration sensed by the pickup 9 are thus indicative of the frequency of workpiece rotation and of the magnitude of unbalance. The phase reference generator 26 provides three sinusoidal output voltages which are 120° electrically displaced from each other. The pickup voltage and one of the three phase reference voltages is applied to a comparator 29 which is included in the computer equipment. The comparator 29 provides an output voltage proportional to the unbalance magnitude in the coordinate direction A, B or C at its stages 31, 32 and 33, respectively, said stages being coordinated to the directions A, B and C, respectively. The comparator 29 provides a control magnitude for the drilling depth of the particular drilling tool which is also coordinated to the same reference direction.

One third of the value X is added to each control value provided by the comparator stage 31, 32 or 33. The addition occurs in the computer device 5 which determines the difference between the preset value of $G_I$ and the variable input value $G_R$ measured by the scale 2. The resultant control magnitudes, preferably in digital form, as hereinbefore explained and as more fully apparent from the aforementioned United States Patent Nos. 2,682,046 and 2,810,307, are supplied to corresponding drill control units 34, 35 and 36 where they determine the depth to which the corresponding drills penetrate the workpiece.

In FIG. 5, each drill control unit 34, 35 and 36 includes a displaceable stop 37, 38 and 39, respectively, which is set in position at a determined distance from the housing of the control unit by rotation of a control gear, for example. Thus, control gears 41, 42 and 43, respectively, control the positions of the displaceable stops 37, 38 and 39. A stop switch is provided on each drill control unit to cooperate with the corresponding displaceable stop. Thus, stop switches 44, 45 and 46 cooperate with the displaceable stops 37, 38 and 39, respectively, to terminate the machine travel and withdraw the drill from the workpiece when the proper depth of each drill is reached. A detailed description of the control of the drilling tools is included in United States Patent No. 2,810,307 particularly relative to FIGS. 8 and 9.

To those skilled in the art, it will be obvious, upon a study of this disclosure, that my invention permits of various modifications, and may be given embodiments other than particularly illustrated and described herein, without departing from the essential features of the invention and within the scope of the claims annexed hereto.

I claim:

1. The method of mass-balancing a planetary-motion rotor which comprises weighing the rotor, thereafter balance-analyzing the rotor relative to at least one correction plane to obtain coordinate unbalance magnitudes indicative of the mass correction needed for balancing the rotor, forming the algebraic sum of the measured rotor weight and the weight of the material corresponding to said unbalance correction, correcting the amount of material of the rotor at localities and in the amounts corresponding to said unbalance magnitudes, and superimposing another correction of the amount of rotor material at predetermined and coordinately interrelated locations of the rotor so as to maintain the balanced condition of the previously balanced rotor, the superimposed correction being equal to the difference between said algebraic sum and a predetermined datum weight of the rotor.

2. The balancing method according to claim 1, which comprises comparing the measured weight of the rotor with a given minimum value and thereafter balance-analyzing only those rotors whose measured weight is at least equal to said minimum value, said minimum value being larger than said datum value by an amount corresponding to the expected maximum unbalance, and effecting said unbalance correction and superimposed correction by removal of material from the rotor.

3. The balancing method according to claim 1, which comprises effecting said unbalance correction and said superimposed weight correction simultaneously by the same tool means.

4. The balancing method according to claim 1, which comprises effecting said unbalance correction at predetermined and coordinately interrelated locations of the rotor.

5. The method of mass-balancing a planetary-motion rotor which comprises correcting the rotor for unbalance by changing the amount of its material at coordinately interrelated localities of at least one correction plane, and superimposing a correction by a balanced change of rotor material in an amount equal to the difference of the original rotor weight modified by the first change minus a predetermined datum weight.

References Cited

UNITED STATES PATENTS 2,694,960 11/1954 Kahle et al _____ 77—1 XR
2,933,984 4/1960 Hack _____ 77—5
3,260,137 7/1966 Obmann _____ 77—5

FRANCIS S. HUSAR, Primary Examiner

U.S. Cl. X.R.

77—5